(12) United States Patent
Steer

(10) Patent No.: US 10,064,399 B2
(45) Date of Patent: Sep. 4, 2018

(54) LURE

(71) Applicant: CRANKA PTY LTD, Golden Valley (AU)

(72) Inventor: Steven Lance Steer, Golden Valley (AU)

(73) Assignee: CRANKA PTY LTD (AU)

(*) Notice: Subject to any disclaimer, the term of this patent is extended or adjusted under 35 U.S.C. 154(b) by 0 days.

(21) Appl. No.: 14/421,893

(22) PCT Filed: Aug. 16, 2013

(86) PCT No.: PCT/AU2013/000910
§ 371 (c)(1),
(2) Date: Feb. 16, 2015

(87) PCT Pub. No.: WO2014/026241
PCT Pub. Date: Feb. 20, 2014

(65) Prior Publication Data
US 2015/0230441 A1      Aug. 20, 2015

(30) Foreign Application Priority Data
Aug. 17, 2012   (AU) ................................ 2012903565

(51) Int. Cl.
*A01K 85/01*         (2006.01)
*A01K 85/00*         (2006.01)
*A01K 85/02*         (2006.01)

(52) U.S. Cl.
CPC .............. *A01K 85/00* (2013.01); *A01K 85/02* (2013.01)

(58) Field of Classification Search
CPC ........ A01K 85/00; A01K 85/16; A01K 85/18; A01K 85/14

USPC .............................................. 43/42.06–42.09
See application file for complete search history.

(56) References Cited

U.S. PATENT DOCUMENTS

| | | | |
|---|---|---|---|
| 1,813,722 A * | 7/1931 | Wright | A01K 85/16 43/42.26 |
| 2,340,569 A | 2/1944 | Setnicka | |
| 2,543,464 A | 2/1951 | McPherson | |
| 2,663,965 A * | 12/1953 | Rosen | A01K 85/16 43/42.09 |
| 2,867,933 A * | 1/1959 | Stookey | A01K 85/18 43/42.02 |
| 3,105,317 A | 10/1963 | Fox | |
| 3,172,227 A * | 3/1965 | MacKey | A01K 85/18 43/42.09 |

(Continued)

FOREIGN PATENT DOCUMENTS

| | | |
|---|---|---|
| JP | 3132520 | 5/2007 |
| WO | WO2014026241 | 2/2014 |

OTHER PUBLICATIONS

International Search Report for PCT/AU2013/000910 (published as WO 2014/026241), 3 pages, dated Sep. 18, 2013.

(Continued)

*Primary Examiner* — Shin H Kim
(74) *Attorney, Agent, or Firm* — Heslin Rothenberg Farley & Mesiti P.C.

(57) ABSTRACT

A lure having the appearance of a sea creature and comprising: a non-buoyant member; and at least one buoyant member connected or connectable to the non-buoyant member so as to float above the non-buoyant member below a water surface.

19 Claims, 9 Drawing Sheets

(56) References Cited

U.S. PATENT DOCUMENTS

| | | | | |
|---|---|---|---|---|
| 3,319,371 A * | 5/1967 | Kinnee | A01K 85/16 43/42.09 |
| 3,935,660 A * | 2/1976 | Plew | A01K 85/01 43/42.24 |
| 4,205,476 A * | 6/1980 | Hsu | A01K 85/16 43/42.06 |
| 4,477,996 A * | 10/1984 | Walter | A01K 95/00 43/42.06 |
| 4,617,753 A * | 10/1986 | Pauley | A01K 85/10 43/42.09 |
| 4,928,422 A | 5/1990 | Pitre | |
| 5,042,189 A * | 8/1991 | Bailey | A01K 85/16 43/42.09 |
| 5,088,227 A * | 2/1992 | Toner | A01K 85/00 43/42.02 |
| 5,446,991 A | 9/1995 | Brackus | |
| 5,894,693 A * | 4/1999 | Davie | A01K 85/00 43/42.24 |
| 5,915,944 A * | 6/1999 | Strunk | A01K 85/00 43/42 |
| 5,953,850 A * | 9/1999 | Hnizdor | A01K 83/00 43/42.25 |
| 5,996,271 A * | 12/1999 | Packer | A01K 85/00 43/42.06 |
| 6,122,856 A * | 9/2000 | Hnizdor | A01K 85/08 43/42.25 |
| 6,182,390 B1 * | 2/2001 | Watkins | A01K 85/08 43/42.11 |
| 6,195,930 B1 * | 3/2001 | Sato | A01K 85/18 43/42.28 |
| 6,393,758 B1 * | 5/2002 | Sparkman | A01K 85/08 43/42.25 |
| 6,546,663 B1 * | 4/2003 | Signitzer | A01K 85/00 43/4.5 |
| 6,675,525 B1 | 1/2004 | Ford | |
| 6,931,785 B1 * | 8/2005 | Johnson | A01K 85/16 43/42.06 |
| 7,493,724 B1 * | 2/2009 | Peterson | A01K 85/00 43/42.03 |
| 7,493,725 B2 * | 2/2009 | Sampson | A01K 85/16 43/42.24 |
| 7,694,453 B1 * | 4/2010 | Arrico | A01K 85/00 43/42.06 |
| 8,230,639 B2 * | 7/2012 | Langer | A01K 85/00 43/42.11 |
| 8,312,669 B2 * | 11/2012 | Thomas | A01K 85/01 43/17.1 |
| 8,793,924 B2 * | 8/2014 | Hughes | A01K 85/18 43/42.02 |
| 8,869,446 B2 * | 10/2014 | Parks | A01K 85/02 43/42.28 |
| 8,950,105 B2 * | 2/2015 | Thomas | A01K 85/01 43/17.1 |
| 9,474,257 B1 * | 10/2016 | McGilvry | A01K 85/02 |
| 2005/0193620 A1 * | 9/2005 | King | A01K 85/00 43/42.26 |
| 2006/0201050 A1 * | 9/2006 | Troutman | A01K 85/00 43/42.19 |
| 2006/0265936 A1 * | 11/2006 | Wilkinson | A01K 85/16 43/42.47 |
| 2007/0144054 A1 * | 6/2007 | Warczok | A01K 85/00 43/42.06 |
| 2008/0115402 A1 * | 5/2008 | Helmin | A01K 85/14 43/42 |
| 2008/0148623 A1 * | 6/2008 | Uhrig | A01K 85/02 43/42.39 |
| 2008/0289243 A1 * | 11/2008 | Huddleston | A01K 85/00 43/41 |
| 2009/0172993 A1 * | 7/2009 | Willis | A01K 85/00 43/42.28 |
| 2010/0229454 A1 * | 9/2010 | Cunningham | A01K 85/00 43/42.31 |
| 2012/0017489 A1 | 1/2012 | Partridge | |
| 2012/0102815 A1 | 5/2012 | Hughes | |
| 2014/0000149 A1 * | 1/2014 | Signitzer | A01K 85/01 43/42.02 |
| 2014/0250763 A1 * | 9/2014 | Hrncir | A01K 85/18 43/42.06 |

OTHER PUBLICATIONS

International Preliminary Report on Patentability for PCT/AU2013/000910 (published as WO 2014/026241), 4 pages, dated Aug. 15, 2014.
English Translation of Office Action and Office Action, Chinese Application No. 201380043746.4, 17 pages, dated Dec. 21, 2015.
Extended European Search Report, European Patent Application No. EP13829785.8, 4 pages, dated Mar. 22, 2016.
Steer, Australian Patent Application No. AU2013302318, Notice of Acceptance and Allowance along with allowed claims, 5 pages, dated Oct. 5, 2017.
Steer, Australian Patent Application No. AU2013302318, Response to the Examiner's report, 10 pages, dated Sep. 29, 2017.
Steer, Australian Patent Application No. AU2013302318, Examiner's Report, 4 pages, dated Oct. 5, 2016.
Brian Cope, "Catch more sheepshead with this lure from Down Under", www.northcarolinasportsman.com, printout available online on Dec. 6, 2017, at http://www.northcarolinasportsman.com/details.php?id=14284, 6-pages, Jul. 13, 2017.
Tom Slater, "Magazine—Cranka Class" (originally appearing in the Dec. 2015 issue of Modern Fishing Magazine), printout available online on Dec. 6, 2017, at http://www.tommyslats.com/blog/2016/4/5/magazine-cranka-class, 6 pages, Apr. 5, 2016.
My Lure Box : Cranka Crab Lure Review and Video, www.kaydofishingworld.com, printout available online on Dec. 6, 2017, at https://www.kaydofishingworld.com/lure-box-cranka-crab-lures/, 6 pages, Aug. 2016.
"A new Australian Champion is Crowned 2016", www.hobiefishing.com.au/, printout available online on Dec. 7, 2017, at http://www.hobiefishing.com.au/a-new-australian-champion-is-crowned-2016/, 6 pages, 2016.
Liam Carruthers Berkley BREAM Grand Final Winner, https://www.youtube.com/watch?v=Js2LBaBntS8, uploaded to YouTube Nov. 11, 2015, printout available online on Dec. 7, 2017, 2 pages.
Shaun Egan Winner Berkley BREAM Grand Final 2015, https://www.youtube.com/watch?v=xFyJL2aKag8, uploaded to YouTube Nov. 11, 2015, printout available online on Dec. 7, 2017, 2 pages.

* cited by examiner

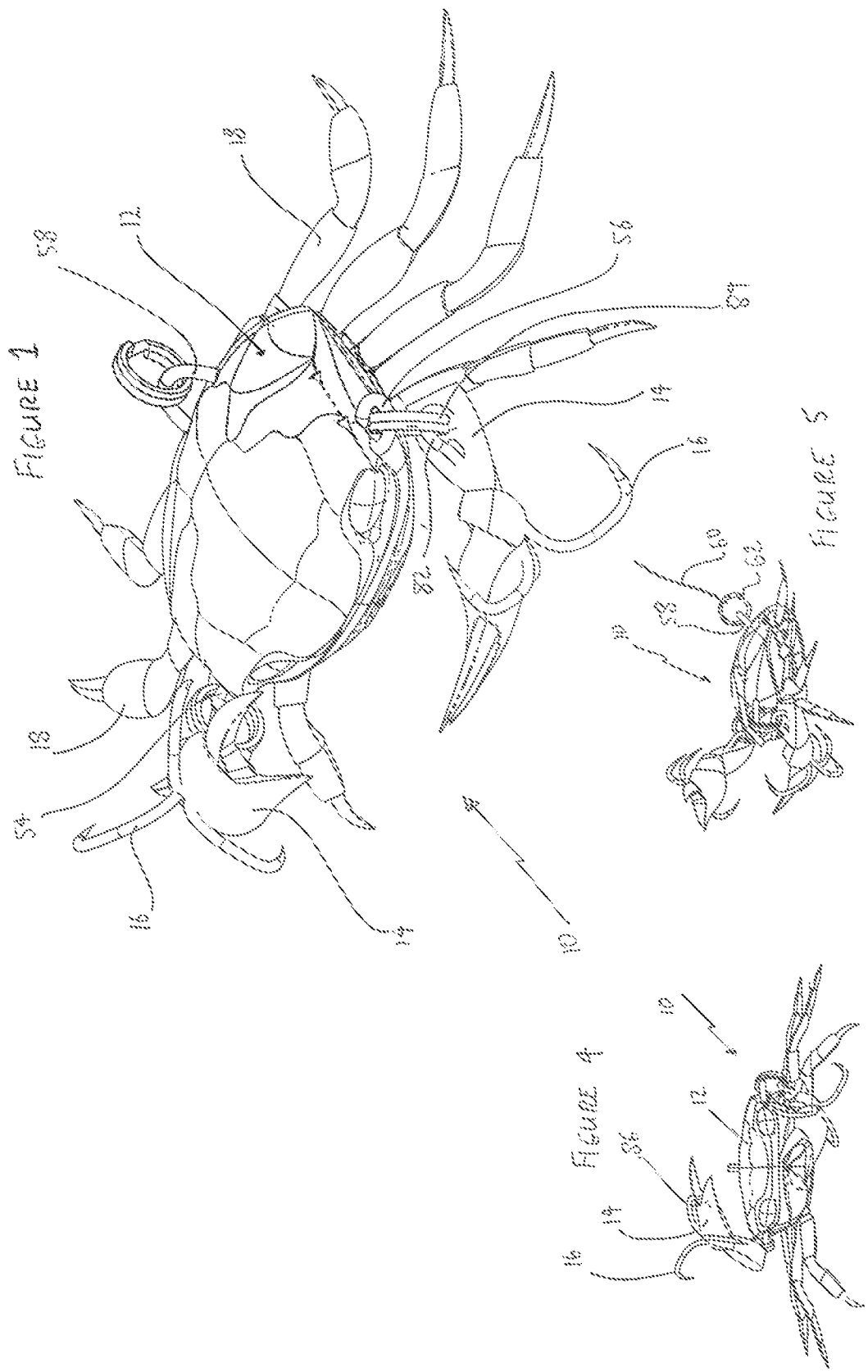

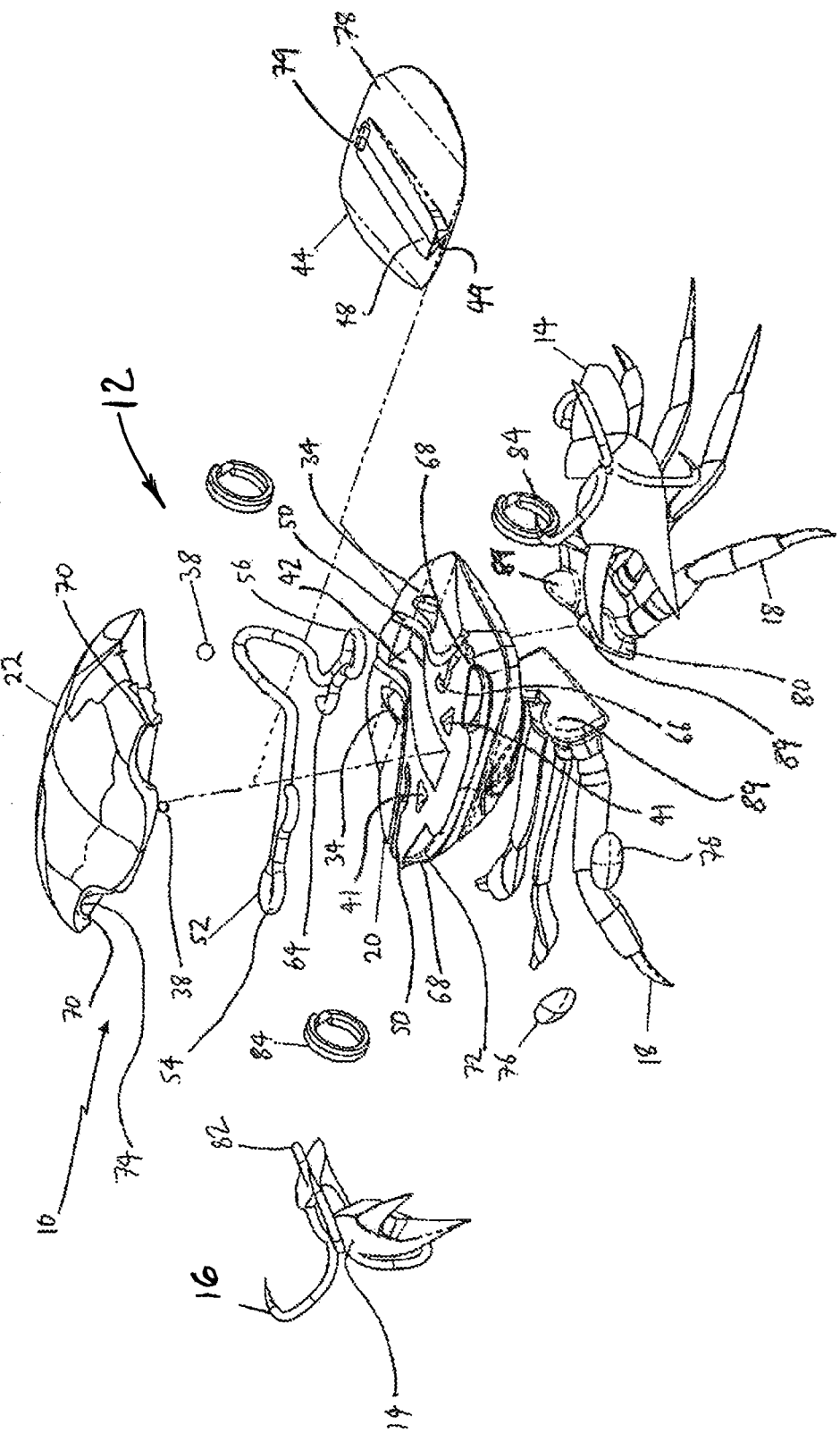

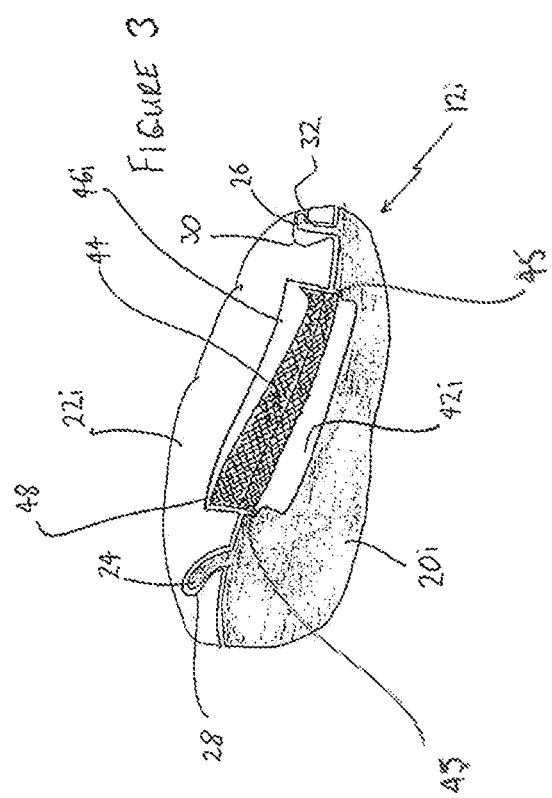

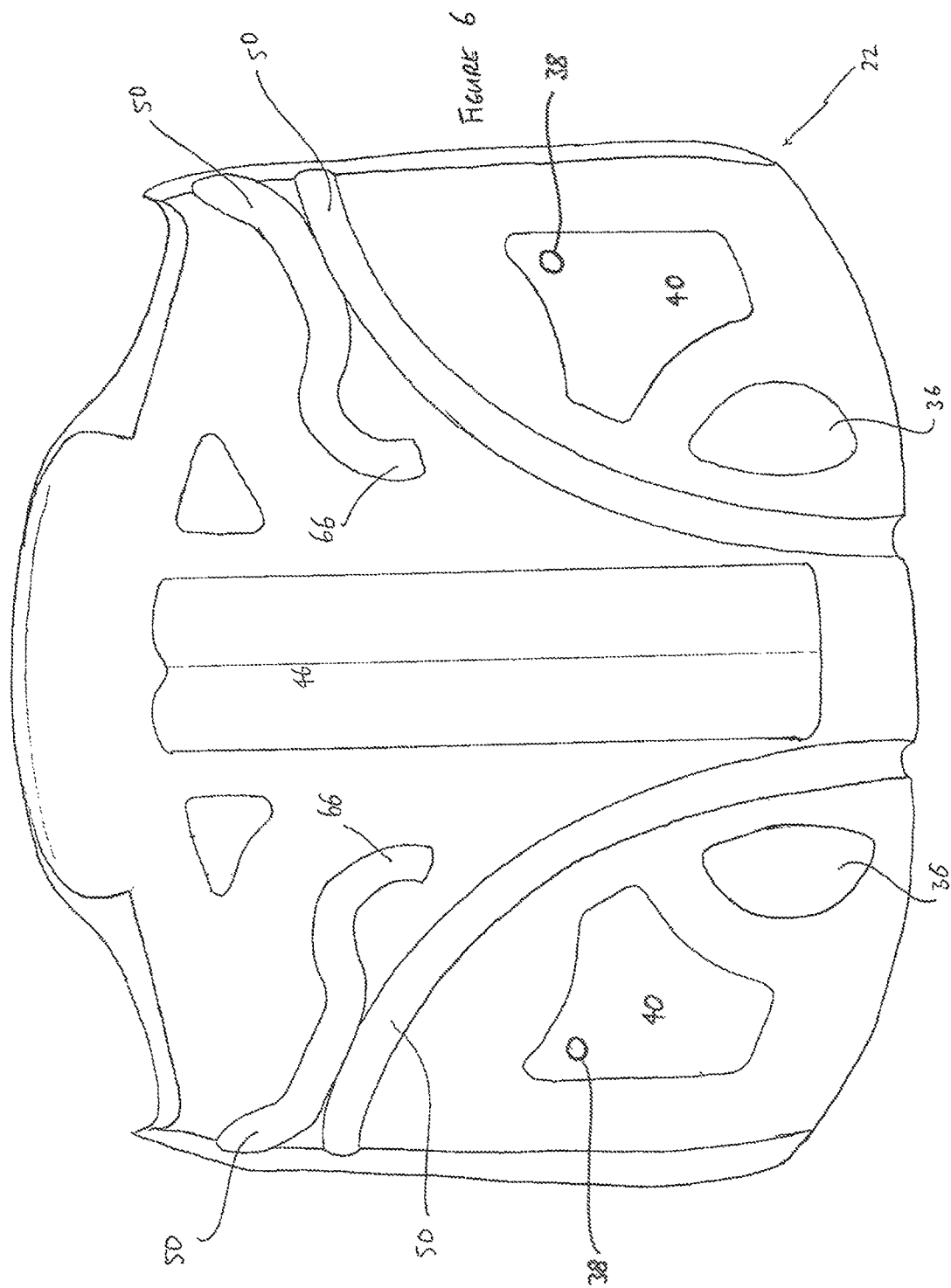

LURE

CROSS REFERENCE TO RELATED APPLICATIONS

This application is a U.S. National Filing of PCT Application No. PCT/AU2013/000910 filed on Aug. 16, 2013, and published in English as WO 2014/026241 A1 on Feb. 20, 2014, and claims priority of Australian patent application number 2012903565 filed on Aug. 17, 2012, the entire disclosure of these applications being hereby incorporated herein by reference.

FIELD OF THE INVENTION

The present invention relates to a lure used to lure a fish or other sea creature.

BACKGROUND

A lure is used to attract the attention of a fish, typically to cause the fish to bite the lure. Lures are often formed with one or more hooks to hook fish that bite the lures.

Lures are usually designed to catch particular types of fish. Each lure therefore simulates the appearance of something from the normal diet of a fish it is intended to catch.

Despite the usefulness of lures, fish are more attracted to bait (e.g. live bait or the flesh of a real creature) since bait has the scent of, and moves like, something the fish would usually eat. Movement of the bait catches the eye of the fish, and the scent of the bait will attract the fish even when the bait is out of eyeshot. However, bait does not keep well unless frozen, which makes lures more practical for circumstances where refrigeration is not available.

SUMMARY OF THE INVENTION

The term "limb", and variants such as "limbs", as used herein is intended to include within its scope appendages and extremities of sea creatures including, but not limited to, a leg, arm, tail, flipper, head, fin or wing.

The term "buoyant", and variants such as "buoyancy", as used herein is intended to refer to buoyancy in water such as seawater, though it may similarly refer to buoyancy in fresh water or another fluid.

The present invention provides a lure having the appearance of a sea creature and comprising:
- a non-buoyant member; and
- at least one buoyant member connected or connectable to the non-buoyant member so as to float above the non-buoyant member below a water surface.

Preferred embodiments may provide a weight encased within or cast into a body of material.

Preferred embodiments may provide a fishhook supported above the non-buoyant member by the buoyant member in use.

Preferred embodiments may provide a fishhook set into the buoyant member.

Preferred embodiments may provide a lure shaped in the form of a crab.

Preferred embodiments may provide one or more buoyant members formed from a material having a density that enables water moving about the lure to cause visible movement in the or each member.

Preferred embodiments may be shaped and/or coloured (e.g. using UV glow paint for low light or turbid conditions, or where crabs in a particular area naturally glow) so as to reproduce the scale pattern of the sea creature the lure is intended to mimic or simulate. For example, a crab scale pattern such as that shown in FIG. 1 may be provided.

Preferred embodiments may employ interchangeable weights, preferably positioned internally of the lure, so as to adjust the cast and sink rates of the lure. A weight may be selectable so that, for example, for a crab shaped lure one of the weights (or the lure itself when unweighted) will cause the lure to sink at the same rate a real crab would sink.

The buoyant member may have at least one buoyant characteristic.

The buoyant member may be of greater buoyancy than the non-buoyant member.

The buoyant characteristic may be that the buoyant member is formed from a material that is less dense than the non-buoyant member.

The buoyant characteristic may be that the buoyant member has a lesser average density than the non-buoyant member. The buoyant characteristic may be that the buoyant member is shaped so as to float above the non-buoyant member.

The buoyant member may be shaped so as to float above the non-buoyant member.

The buoyant member may include one or more air pockets.

The average density of the buoyant member may be calculated using a combined mass of a material from which the buoyant member is formed, and of air in the one or more air pockets, divided by a volume enclosed by the material from which the buoyant member is formed, said volume including a volume of the one of more air pockets.

The buoyant member and non-buoyant member may be formed from different materials.

The buoyant member and non-buoyant member may be formed from the same material.

The buoyant member may be less dense than the non-buoyant member.

The buoyant characteristic is that the buoyant member has a lesser average density than the non-buoyant member.

The buoyant member may be shaped so as to float above the non-buoyant member.

The buoyant characteristic may be that the buoyant member is shaped so as to float above the non-buoyant member.

The buoyant member may include one or more air pockets.

An average density of the buoyant member may be calculated using a combined mass of a material from which the buoyant member is formed, and of air in the one or more air pockets, divided by a volume enclosed by the material from which the buoyant member is formed, said volume including a volume of the one of more air pockets.

The buoyant member and non-buoyant member may be formed from or materials of different densities.

The buoyant member may be at least partially formed from one or more of a soft plastics material, foam, a hard plastics material and rubber.

The buoyant member may be formed from a soft plastic.

The non-buoyant member may be formed from a hard plastic.

The buoyant member may have an appearance of a limb of a sea creature.

There may further be a fishhook attached or attachable to the lure.

The fishhook may be attached or attachable to the lure.

The fishhook may be attached or attachable to the buoyant member.

The fishhook may be supported above the non-buoyant member by the buoyant member in use.

The fishhook may be spaced from the non-buoyant member by the buoyant member in use.

The fishhook may be set into the buoyant member.

The lure may further comprise a weight.

The non-buoyant member may comprise a body of material and the weight is cast into said body of material.

The average density of the non-buoyant member may be calculated using a combined mass of the weight and body of material, divided by a combined volume of the weight and volume of the body of material.

The weight may be connected or connectable to the body.

The non-buoyant member is sufficiently heavy so that it will sit on or just above a seabed in use.

The buoyant member may be able to be disconnected from the non-buoyant member.

The non-buoyant member and the or each buoyant member may be connected or connectable through a respective flexible connector.

The respective flexible connector may be a pair of interconnecting loops, one of the pair of loops being provided on the respective buoyant member and the other of the pair of loops being provided on the non-buoyant member.

The lure may be shaped so as to have the appearance of a crab.

The non-buoyant member may be shaped to have the appearance of a cephalothorax.

The buoyant member may be one of a plurality of such members simulating the appearance of crab limbs.

The buoyant limbs may simulate the appearance of crab claws.

The lure may further comprise limbs simulating the appearance of crab legs.

The limbs may be formed from a buoyant material.

The limbs may be formed from a combination of buoyant and non-buoyant materials.

The buoyant members may be formed from a material having a density that enables water moving about the lure to cause visible movement in the respective member.

The lure may further include a scent chamber.

The present invention also provides a buoyant member having the appearance of at least a portion of a sea creature, the buoyant member comprising:
a buoyant body; and
an anchoring member for anchoring to a sea creature lured by the buoyant member.

Preferred embodiments may further include an attachment member for attaching the buoyant member to fishing equipment.

BRIEF DESCRIPTION OF THE DRAWINGS

Preferred embodiments will now be described by way of non-limiting example only, with reference to the accompanying drawings, in which:

FIG. 1 is a perspective plan view of a lure in accordance with an embodiment of the present invention;

FIG. 2 is an exploded or disassembled view of the lure of FIG. 1;

FIG. 3 is a partial cross-sectional view of the body of an alternative embodiment of the lure;

FIG. 4 is a front view of the lure of FIG. 1, positioned under the water with the right (buoyant) claw in a defensive position;

FIG. 5 is a side perspective view of the lure of FIG. 1;

FIG. 6 is a close-up view of the underside of a top part of the body of the lure of FIG. 1, prior to that top part being fixed to a bottom part of the body;

DETAILED DESCRIPTION

Figure 7:
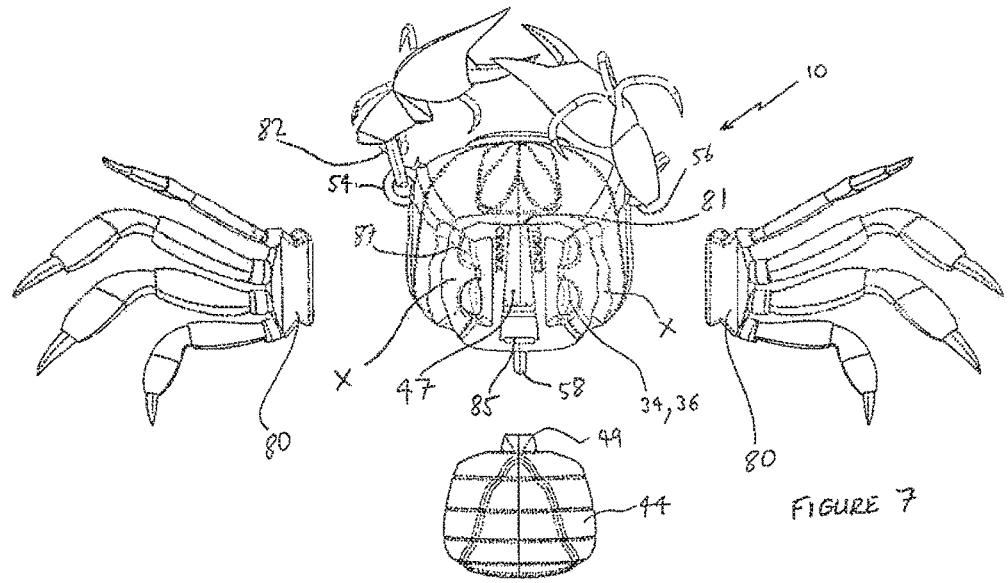
FIG. 7 is a bottom exploded view of the lure of FIG. 1.
Figure 8:
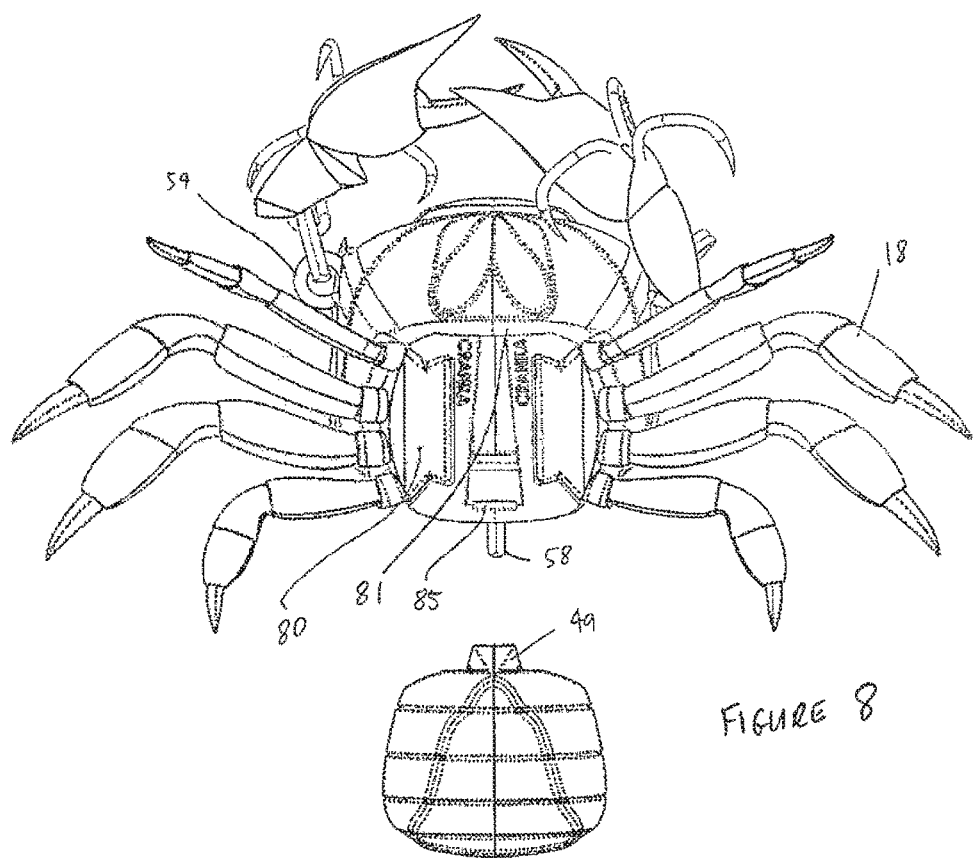
FIG. 8 shows the lure of FIG. 7, with the legs positioned in the body.

A lure 10 as shown in FIG. 1 has the appearance of a sea creature and, in particular, is shaped to have the appearance of a crab. The lure 10 comprises a non-buoyant member 12 and a number of buoyant limbs 14.

The buoyant limbs 14 are connected to the non-buoyant member 12 so as to float above the non-buoyant member 12 below a water surface.

The lure 10 further comprises a pair of treble fishhooks 16 attached to respective buoyant limbs 14, to hook a fish (not shown) lured by the lure 10.

The lure 10 has the appearance of a crab so as to lure fish for which crab is part of their usual diet. To this end, the non-buoyant member 12 is shaped to have the appearance of the cephalothorax of a crab, the buoyant limbs 14 have the appearance of claws and the lure 10 is further provided with non-buoyant limbs 18 having the appearance of crab legs. The crab legs 18 and cephalothorax 12 may together constitute the non-buoyant member, though in the present embodiment they are separate and separable features so as to enable substantial disassembly of the lure 10.

In addition, the non-buoyant member 12, with or without legs 18, and buoyant member 14 may be formed from the same or similar materials, with the non-buoyant member 14 including or encapsulating a weight so as to cause it to sink in water. For example, the non-buoyant member 14 and buoyant member 12 may be formed from soft or hard plastics materials. However, in the embodiment shown in FIG. 1, the non-buoyant member 14 is formed form hard plastics material and the buoyant member 12 is formed from soft plastics material (e.g. foam).

While the non-buoyant member 12 is formed from hard plastics, the legs 18 may be formed from soft plastics. Where the legs 18 are formed from soft plastics, water moving past the lure will cause movement in the legs 18 making the lure 10 appear to crawl under water. As a further alternative, some of the legs may be formed from a more rigid material than other legs, so that the legs formed from more rigid material maintain the lure 10 above the floor of a body of water, while water causes movement in the legs formed from less rigid material so as to make the lure 10 appear to crawl along the floor of the body of water.

The shape and surface of the non-buoyant member or body 12, or buoyant member 14, can be designed to mimic the shape and appearance of a particular creature. The description hereunder relating to the variation in shape and appearance of the non-buoyant member 14 will be understood to be similarly applicable to the shape and appearance of the buoyant member 14.

The non-buoyant member 12 is contoured (e.g. shaped) and given an appearance (e.g. colour, reflectivity) that replicates the scale pattern of the cephalothorax of a live crab as mentioned above. For example, the non-buoyant member 12 may be provided in various colours, sizes, sheens, scale patterns and weights, enabling selection of an appropriate non-buoyant member 12 to mimic those same characteristics of a live crab or other creature, particularly a crab or creature local to the particular area in which the lure is intended to be used. The same variability in design applies to the limbs 14, 18, the characteristics of which can be selected independently of the characteristics of the body 12.

In addition, the number of non-buoyant members 12 and buoyant members 14 can be selected to provide an appearance consistent with a particular sea creature, or even the appearance of an unwell or injured sea creature (e.g. a crab with a claw removed).

With reference to FIG. 2, the body 12 comprises two dissimilar parts 20, 22 and a weight 44. The parts 20, 22 are permanently welded, adhered or otherwise connected together to form the bulk of the non-buoyant cephalothorax member 12. The weight can be formed into the body 12, such as by moulding the body 12 around the weight 44. In the embodiments described below, however, the weight 44 is either attached to or encapsulated in the body 12 in a removable manner. This enables the weight 44 to be interchanged with other weights of different sizes and/or mass.

In an alternative embodiment as shown in FIG. 3, parts 20i, 22i are connectable together to form the simulated crab cephalothorax 12i. The parts 20i, 22i are respectively the bottom and top parts of the simulated cephalothorax 12, but it will be appreciated that the body 12i, similar to the body 12, may comprise any number of components that come together in any number of different ways to form the body 12i.

The parts 20i, 22i may connect together by any known system, including a cooperating lug 24, 26, slot 28, 30 and aperture 32 system as shown in FIG. 3. To assemble the parts 20i, 22i together, lug 24 is inserted into slot 28. By rotation of bottom part 20i the lug 24 progresses further into slot 28 thereby bringing lug 26 up and into slot 30. Once completely inserted into slot 30, the nub of lug 26 projects into aperture 32 to hold lug 26 in position in slot 30 and lock the bottom part 20i to the top part 22i. To separate the part 20i, 22i, the nub of lug 26 is depressed back into the aperture 32 to enable the lug 26 to be withdrawn from the slot 30.

With further reference to the embodiment of FIG. 2, the bottom part 20 of the body 12 includes a pair of through holes 34 extending through the bottom part 20, and the top part 22 includes a cooperating pair of depressions 36 (see FIG. 6). When the two parts 20, 22 are welded or otherwise fixed together, the through holes 34 and depressions 36 align to form larger depressions or recesses accessible from the underside of bottom part 20. The recesses are each shaped to receive a butt 80, or part thereof, of a set of legs 18.

The lure 10 further includes two ball bearings 38 that are received in respective cavities 40 in the top part 22 prior to the parts 20, 22 coming together. The cavities 40, together with an upper surface of the bottom part 20, form rattle chambers. As the assembled crab body 12 moves (e.g. under the influence of water or fish strike) the ball bearings 38 rattle around inside the rattle chambers, mimicking the sound made by a crab when rubbing its claws on its anterolateral teeth or lateral spine, or over horns or bumps, of its cephalothorax.

The bottom part 20 includes two buoyancy cavities 41 towards the front of the "head" of the lure 10. The cavities provide a small amount of buoyancy in an upper part of the body 12 to help the lure 10 'self-right' itself in the event that it lands upside down on the floor of a body of water. The cavities 41 will generally be air-filled and assist in maintaining an upright position of the lure 10 as it sinks through water, and when it comes to rest on the floor of a body of water.

These two cavities 41 are small and triangular in shape. However, it will be understood that there may be any number of such cavities, and those cavities may have any desired shape, or the cavities 41 may be altogether omitted in some circumstances. In addition, the buoyant members 14 may be positioned, or connected to the non-buoyant member 12, such that an orientation of the non-buoyant member 12 is maintained while the lure 10 sinks and when it comes to rest on the floor of a body of water.

The bottom part 20 further includes a main central through hole 42 and the top part 22 includes a slot 46 that aligns with the through hole. For each part 20, 22 the through hole 42 or slot 46 runs front to back down the middle of the body 12 and is substantially rectangular in cross-section, though any shape may be used.

When the top and bottom parts 22, 20 have been fixed together the through hole 42 and slot 46 form a large recess 47 in the body 12 (see FIG. 7). A scenting product (e.g. oil, capsule or crab meat) can be positioned in the recess 47, and thus recess 47 will form a scenting chamber.

Figure 9:
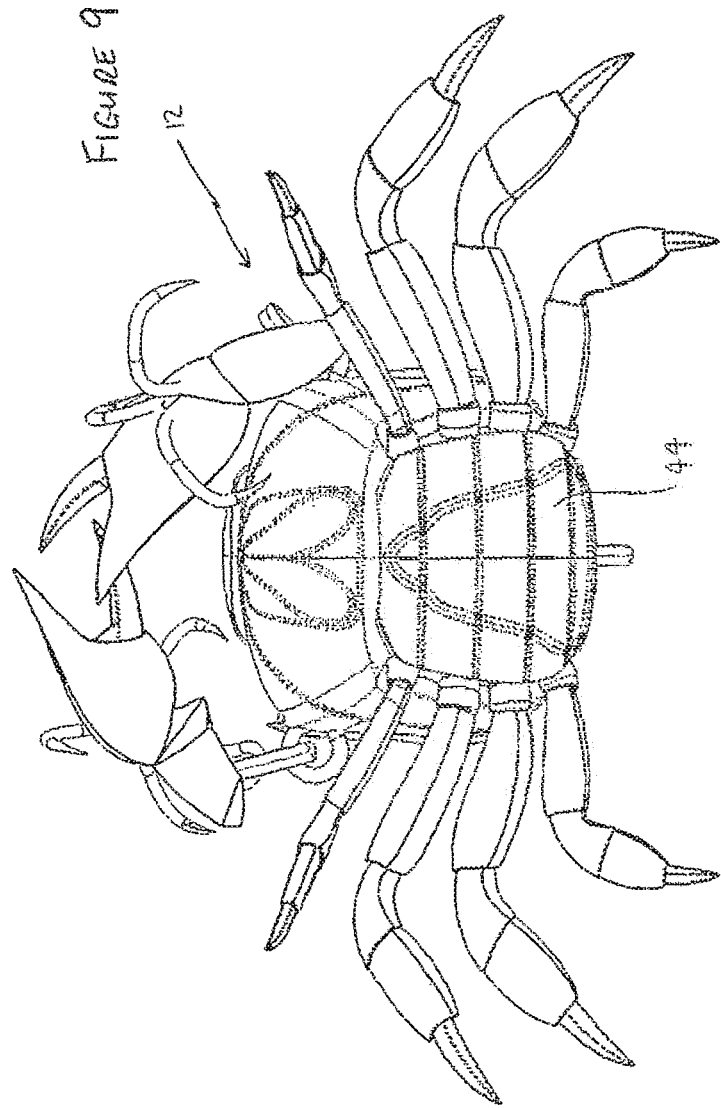
FIG. 9 shows the lure of FIG. 8, with the base plate securing the legs in position in the body.

When the weight 44 has been connected to the underside of the bottom part 20 as shown in FIG. 9, the scenting chamber 47, formed by the through hole 42, depression 46 and weight 44, is substantially closed. While substantially closing the scent chamber would appear to trap the scent and thereby render redundant the scent chamber, it has been found that the scent will slowly leak out between the bottom part 20 and weight 44 to scent the water around the lure 10.

With reference again to FIG. 3, where the top and bottom parts 22i, 20i are releasably connectable, the bottom part 20i contains an elongate slot 42i similar to the slot 46i in the top part 22i. The top and bottom parts 22i, 20i can be brought together to trap the weight 44 therebetween, with the lug 48 of the weight 44 being received in the slot 46i in the top part 22i thereby to hold the base plate or weight 44 in position between the two parts 20i, 22i when the body 12i is assembled. The void in the slot 42i beneath the weight 44 is substantially closed and may constitute a scenting chamber similar to that described above.

The slot 42i, 46i in either the top part 22i or bottom part 20i may alternatively be shaped so that it is sufficiently large to both receive the lug 48 and to form a scent chamber in an area of the depression not occupied by the lug 48, thereby avoiding the need for a depression in the other part 20i, 22i.

In contrast to the scenting chambers of the embodiments shown, prior art scent chambers typically have a dedicated channel through which scent exits the body of a lure. The dispersion of scent into the water occurs rapidly due to the open nature of the channel. To this end, it will be understood that the scenting chamber of the lure 10 shown in the drawings is intended to permit only a slow dispersion of scent into the water and that any similar arrangement of scenting chamber permitting such slow dissipation are intended to be included within the present disclosure.

Referring to FIGS. 2 and 6, a pair of matching sets of grooves 50 (one set in each of the top part 22 and bottom part 20) includes grooves running from the rear of the body 12, between the through holes 34 and through hole 42 of the bottom part 20, and between the depressions 36 and slot 46 of the top part 22, and outwardly of the body 12 to a position whereat the claws of the crab would typically be connected to the cephalothorax 12. Each groove in the set of grooves 50 in the top part 22 matches a groove in the set grooves 50 in the bottom part 20 so that when the two parts 20, 22 are brought together the sets of grooves 50 form tunnels through the body 12. The grooves 50 are shaped to snugly receive a through wire 52 so that as the two parts 20, 22 of the body 12 are fixed together the through wire 52 conforms to the path of the tunnels and is trapped therein.

In an assembled state of the lure 10, the through wire 52 extends outwardly from the sides and rear of the body 12, the wire 52 and body 12 forming three loops 54, 56, 58 as shown in FIG. 1. In use, a fishing line 60 connects to the rear loop 58 (or via a spring ring 62 to the rear loop 58 as shown in FIG. 5) and the two buoyant claws 14 connect to the lateral or side loops 54, 56.

At either end of the through wire 52 is a bend or curve 64 passing through an angle, say 90°, that conforms to a bend or curve 66 in the channel 50. The bend 66 serves to anchor the end 64 of the through wire 52 in the body 12 to prevent its withdrawal in the event that a fish tugs at the limb 14 attached to the respective lateral loop 54, 56.

It will be appreciated that other arrangements or connections may be used for connecting the buoyant limbs 14 to the non-buoyant member 12, and similarly for connecting legs 18 to non-buoyant member 12. In some embodiments, connections are chosen to limit movement of the buoyant member 14 and/or legs 18 relative to the non-buoyant member 12 to movements that more closely replicate the movements of a crab or sea creature the lure 10 is designed to imitate.

At the front of both the top and bottom parts 20, 22 of the body 12 are pairs of indents 68, 70 each of which has a convex rear wall 72, 74. When the top and bottom parts 20, 22 come together the indents 68 in the bottom part 20 align with the indents 70 in the top part 22, thereby forming two recesses in the body 12, each recess having a convex rear surface formed by aligning the convex rear walls 72, 74.

The recesses formed by the indents 68, 70 are shaped to receive oval eyes or lenses 76 that simulate the eyes of a crab. The eyes 76 can be glued or otherwise attached in any suitable manner onto the convex rear surfaces.

Alternatively, a slot may be provided that circumscribes the convex rear wall of each indent 68, 70. When the top and bottom parts 20, 22 come together the slots in the bottom part 20 will align with the slots in the top part 22, whereby the area circumscribed by the slots 72, 74 will be greater than the cross-sectional area of the respective depression.

The oval eyes or lenses can then be shaped to fit, either loosely or using a friction fit, into the slots and when the top part 22 is brought against the bottom part 20 the eyes will be locked in position. Since the eyes will then fill the area circumscribed by the slots they will be too large to fit through the smaller recesses formed by the indents.

The base plate or weight 44 is received on an underside of the bottom part 20 of the body 12. Thus the base plate 44 weighs down the body 12. The base plate 44 has a substantially planar portion 78 and a protruding lug 48 extending from the planar portion 78. The protruding lug 48 as shown in FIG. 2 includes a tab 49 extending forwardly of the planar portion 78, and a nub 79 protruding rearwardly (see FIG. 2).

The underside of the bottom part 20 of the body 12 includes a lip 81 under which tab or tongue 49 is received, a groove 47 in which the bulk of the lug 48 is received, and a tab 85 behind which nub 79 is received. Thus the weight 44 can be attached to the underside of the bottom part 20 of the body 12 by sliding lug 48 along the underside with the groove 47 until the tongue 49 is received under the lip 81, and the rear part of the base plate 44 (the end closest to the nub 79) is then pushed towards the bottom part 20 to urge the nub 79 to snap into position behind the tab 85 thereby to releasably lock the weight 44 to the bottom part 20 of the body 12 as shown in FIG. 9.

While excluded from the present embodiment, the top surface of the weight 44 may include a rubberized layer or lip extending at least partially across the weight 44, or at least partially around the periphery of the weight 44. When the weight 44 is connected to the bottom part 20, the rubberized layer or lip may compress to resiliently bear against the bottom part 20 to improve connection between the weight 44 and bottom part 20. Thus there is a reduced likelihood that the weight 44 will be dislodged during descent of the lure 10 through the water, or when a fish strikes the lure 10.

Of note is that, prior to connection of the weight 44 to the bottom part 20 of the body 12, scent can be inserted into groove 47 which, as discussed above, is formed by the aligned through hole 44 and slot 46 when the parts 20, 22 of the body 12 are brought together.

The weight 44 is designed to be proportional to the size of the crab lure 10 so that when the crab lure 10 sinks in water, it sinks at the rate a live crab would sink. Similarly, the mass of the weight 44 may take into account the surface area presented by the lure 10 to the water, since reducing the surface area of the body 12 without reducing the mass of the weight 44 will result in faster sinking of the lure. Where the present weight 44 is, for example, 2.2 g it may be swapped for a 4.4 g weight so the crab lure 10 sinks at a faster rate. There may be any number of weights 44 so that in faster currents or deeper water the weight can be increased so the lure 10 sinks at a faster rate and, in lower currents or shallower water, the weight 44 can be reduced so that the crab lure 10 sinks closer to the rate a live crab would sink.

In the embodiment of FIG. 3, when the top part 22i and bottom part 20i come together a void is created in which the base plate 44 is received when the body 12i is assembled. So that the base plate 44 remains in position in the void regardless of the weight of the plate 44, alternate base plates (i.e. base plates of different masses) can either be formed from materials of different density, thereby allowing the base plates to have a consistent shape and size, or can be formed with the same critical dimensions (e.g. distance between the top of the lug 48 and the bottom of the base plate 44, along with a consistently shaped lug 48).

It can be desirable for the weight 44 to remain relatively fixed in position in the lure 10 during use. Fixing the weight 44 in position can preclude the weight 44 moving as the lure 10 descends, which might otherwise cause the lure 10 to descend awkwardly and deter a fish from striking the lure 10. If capable of free movement, the weight 44 might also move around in the scent chamber (e.g. slot 42i as shown in FIG. 3) and, in effect, push or pump scent from the chamber at a greater rate than desired.

To maintain the weight 44 in position in or on the lure 10, the lure 10 may comprise one or more supports. In the embodiment of FIG. 3, a support is positioned in the slot 42i. The support comprises a pair of lips 45, one located at either end of slot 42i. The lips 45 together support the weight 44 at forward and rear ends and prevent it from moving further into the slot 42i than desired. Consequently, a volume is retained in slot 42i at all times, for use as the scent chamber.

It will be appreciated that many other forms of support may be used. For example, the top surface of the bottom part 20i (e.g. the portion of the top surface surrounding the slot 42i in the bottom part 20i) may be used instead of providing lips 45. Alternatively, the lips 45 may be replaced by a single lip extending around the periphery of slot 42i.

Where weights of different sizes are used, supports can be provided to suit each respective weight. For example, a series of pairs of lips may be provided at either end of slot 42i that give the respective ends of slot 42i a stepped shape so that progressively smaller weights will be supported by progressively closer pairs of stepped lips.

As an alternative to the interchangeable weights 44, the non-buoyant member or body may comprise a weight cast into a lump (i.e. a body) of material that is shaped as appropriate to replicate the desired part of a sea creature. For example, the weight may be moulded or cast onto the through wire 52, the top and bottom parts 22, 20 being then fixed about the through wire 52 and weight moulded thereto, to fix the weight within the body 12. In this case the weight will be encapsulated and thus not interchangeable, though a plurality of differently weighted bodies may be provided for selective use in various conditions.

Where the legs 18 are formed separately from the body 12, the bottom part 20 of the body 12 can be contoured as shown at X in FIG. 7, and the butt 80 of the legs 18 is shaped to conform to that contouring. Within each region of contouring X is a recess formed by the aligned through holes 34 and depressions 36 as discussed above, and a further recess 87.

The legs 18 join at a common butt 80, though they may be provided separately. As the legs 18 are brought into conforming abutment with the underside of the bottom part 20 a pair of knob-like protrusions 89 (see FIG. 2) of the respective butt 80 is received in recess 87 and the recess formed by the aligned through holes 34 and depressions 36 as shown in FIG. 7. The base plate or weight 44 is then connected to the bottom part 20, securing and fixing the legs 18 to the body 12 as shown in FIG. 9.

The legs 18 may be provided separately, rather than converging into a common butt, and may also be connected in any other appropriate manner to the body 12.

The legs 18 may be formed from a non-buoyant material so as to remain below the body 12 in use. Alternatively, if it is advantageous to produce movement in the legs 18 under the influence of water flowing around the lure 10, the legs 18 can be formed from a buoyant material, or from a combination of both buoyant and non-buoyant materials.

The buoyant limbs 14 are each preformed in the shape of a crab claw. Each claw 14 supports a treble hook 16 above the non-buoyant member 12. In the example shown, the treble hook 16 is set in the buoyant member 14 (e.g. the buoyant member 14 is moulded or fitted around the hook 16) so that the treble hook 16 floats above the body 12, below the surface of the water. The treble hook 16 may be supported on the buoyant limbs 14 by any other method.

In use, the body 12 will rest on the seabed and the claws 14 will float above the body 12. Since the claws 14 incorporate the hooks 16, so that the claws 14 float above the body 12 in use, the hooks 16 are elevated above the seabed. This greatly reduces the likelihood of the hooks 16 snagging on the seabed.

Also incorporated into each claw 14 is a metal loop 82. While the loop 82 can be formed into the claw 14 separately from the hook 16, in the present embodiment the loop 82 is part of the treble hook 16.

A spring ring 84 is attached to the wire loop 82 of each claw 14, each spring ring 84 also being attached to a respective lateral loop 54, 56 on the body 12. The spring rings 84 enable the limbs 14 to be disconnected from the body 12. Each spring further absorbs some of the impact load (i.e. shock) of a fish striking the respective claw 14.

Thus the treble hooks 16 are connected to the through wire 52, and the through wire 52 is connected to the fishing line 60, thereby connecting the treble hooks 16 to the fishing line 60. Consequently, if a big fish happens to break the body 12 or claws 14 of the lure 10, the fish will still be hooked on the fishing line 60 through the metal to metal connections between the hooks 16 and through wire 52.

The fishhooks 16 and limbs 14 may also be attached separately to the respective spring rings 84. Moreover, any appropriate system may be used for connecting the limbs 14, body 12 and fishhooks 16, and the limbs 14 may be integral with the body 12 even though they are formed from different materials or materials of different densities (e.g. soft plastics for the buoyant limbs 14 and hard plastics for the non-buoyant body 12). It may be that the system is a flexible connector, such as the combination of loops 54, 82 and spring ring 84, or may be any other connector system.

The claws 14 are formed from a material having a density that enables water moving about the lure 10 to cause visible movement in the claws 14. Such a material may be a soft plastic or other buoyant material. The ability to be influenced by the movement of water causes the crab claws 14 to move in a manner designed to mimic the movements of a live crab, particularly when in a defensive position. This is demonstrated by the position of the right claw 86 of the crab lure 10 shown in FIG. 4.

Conversely, while the legs 18 may be made from a material similar to that of the claws 14, the legs 18 may instead be formed from a heavy material (e.g. hard plastics). This would enable the body 12 and claws 14 to be formed from a buoyant material since the legs 18 would weigh down the lure 10, or would alternatively make it easy to manufacture the body 12 and legs 18 as a single integral piece.

The buoyant member 14 floats above the non-buoyant member 12. To that end, the buoyant member 14 has at least one buoyant characteristic. The buoyant characteristic may include shaping of the buoyant member 14, e.g. using one or more aerofoils, such that it floats above the non-buoyant member 12. In this case, water moving past the buoyant member may cause the buoyant member 14 to float above the non-buoyant member 12. In other words, the buoyant member 14 is buoyant when in moving water. The buoyant characteristic may alternatively, or in addition, be that the buoyant member 14 is of greater buoyancy than the non-buoyant member 12.

To be capable of floating above the non-buoyant member 12, the buoyant member 14 may be less dense than the non-buoyant member 12. Whether or not the non-buoyant member 12 and buoyant member 14 are formed from the same material, the buoyant member 14 may have a lesser average density than the non-buoyant member 12. In other words, the relative densities of the non-buoyant member 12 and buoyant member 14 may differ due to them being formed from different materials, or where one material is expanded (e.g. porous) and the other is not, where the non-buoyant member 12 includes a weight 44, and in other cases all of which are intended to fall within the scope of the present disclosure.

To ensure buoyancy, the buoyant member 14 may include one or more air pockets (not shown). In this case, the average density of the buoyant member 14 would include the combined mass of a material from which the buoyant member 14 is formed, and of air in the one or more air pockets, divided by a volume enclosed by the material from which the buoyant member 14 is formed, where that volume includes the volume of the one of more air pockets.

Similarly, the non-buoyant member 12 may comprise the weight 44. For example, the non-buoyant member 12 may include a body of material into cast around the weight 44. In this case, the average density of the non-buoyant member 12 would equate to the combined mass of the weight 44 and body of material cast around the weight, divided by a combined volume of the weight 44 and volume of the body of material.

The volume of the non-buoyant member 12 may also include the volume of any cavities, though these will generally be filled with water as the non-buoyant member 12 sinks. To that end, the average density of the non-buoyant member 12 may change such that the non-buoyant member 12 has a first average density when out of the water, and a second average density when in the water when the cavity or cavities in the non-buoyant member 12 fill with water. It may be that the average density of the non-buoyant member 12 is in all cases the average density of the non-buoyant member 12 when in water, which may include the density as incorporating water in any cavities, and the volume of those cavities, the mass and volume of any weights incorporated into or connected to the non-buoyant member 12 and so forth.

Whether or not the buoyant member 14 incorporates air pockets, the buoyant member 14 may be at least partially formed from one or more of a soft plastics material, foam, a hard plastics material and rubber.

Since the lure 10 is intended to be capable of being dismantled, many of the parts of the lure (e.g. non-buoyant member 12, buoyant member 14, weight 44) can be supplied separately. For example, a buoyant member (e.g. claws/buoyant limbs 14) may be provided separately from the other parts. The buoyant member would include a buoyant body (e.g. buoyant material shaped like a crab claw) and an anchoring member, such as one or more hooks, for anchoring to a sea creature lured by the buoyant member.

The buoyant member may further include an attachment member such as a ring 82, for attaching the buoyant member 14 to a fishing line, sinker, lure or other piece of fishing equipment. The attachment member may be connected directly to the anchoring means. For example, where the anchoring member is a hook and the attachment member is a ring, the hook and ring may be integral as discussed above in relation to FIG. 2, or may be linked together in a similar manner to that by which ring 84 links with ring 82 of hook 16. The buoyant body is then formed, for example by moulding, around at least a part of the anchoring means.

The buoyant body may be shaped like a claw as discussed above, or may alternatively have the shape of any other part of a sea creature, where that part could be expected to float or be held aloft for example in the manner that a crab holds its claws above its head when in a defensive position.

Figure 10:
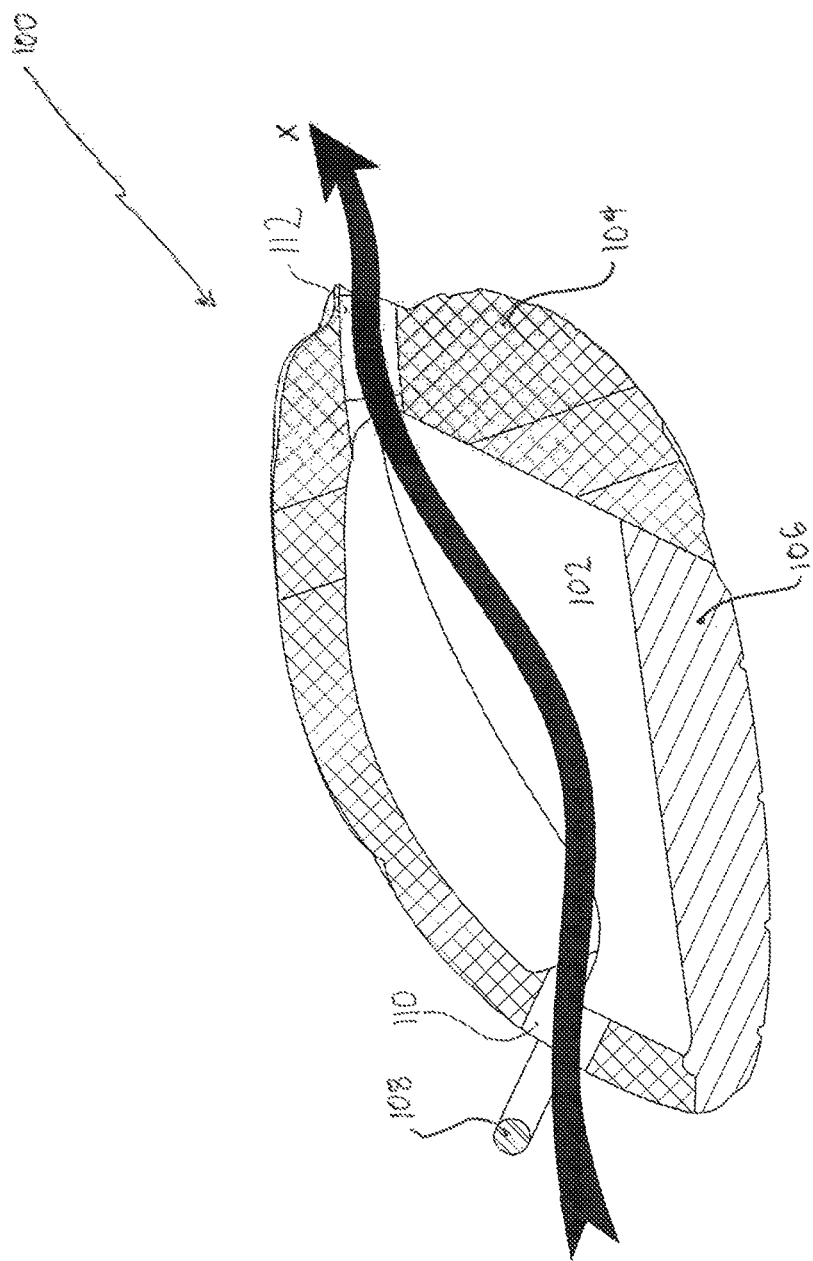
FIG. 10 is a side cross-sectional view of an alternative embodiment of a lure in accordance with the present invention, identifying a flow path for fluid to dispense scent from the lure.
Figure 11:
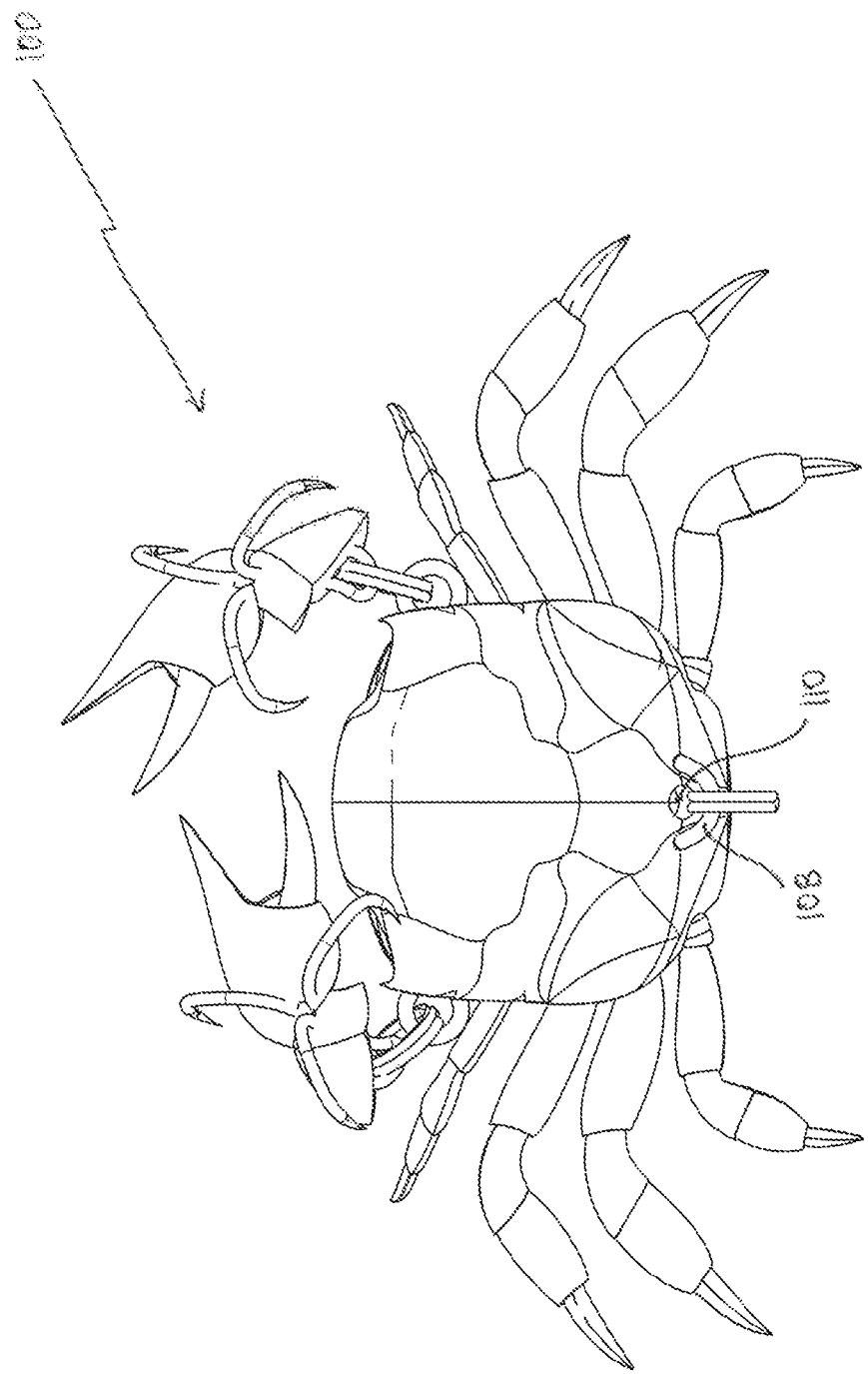
FIG. 11 is a top view of the lure of FIG. 10, showing a rear scent hole through which scent is introduced into the lure and through which water enters the lure to mix with the scent.
Figure 12:
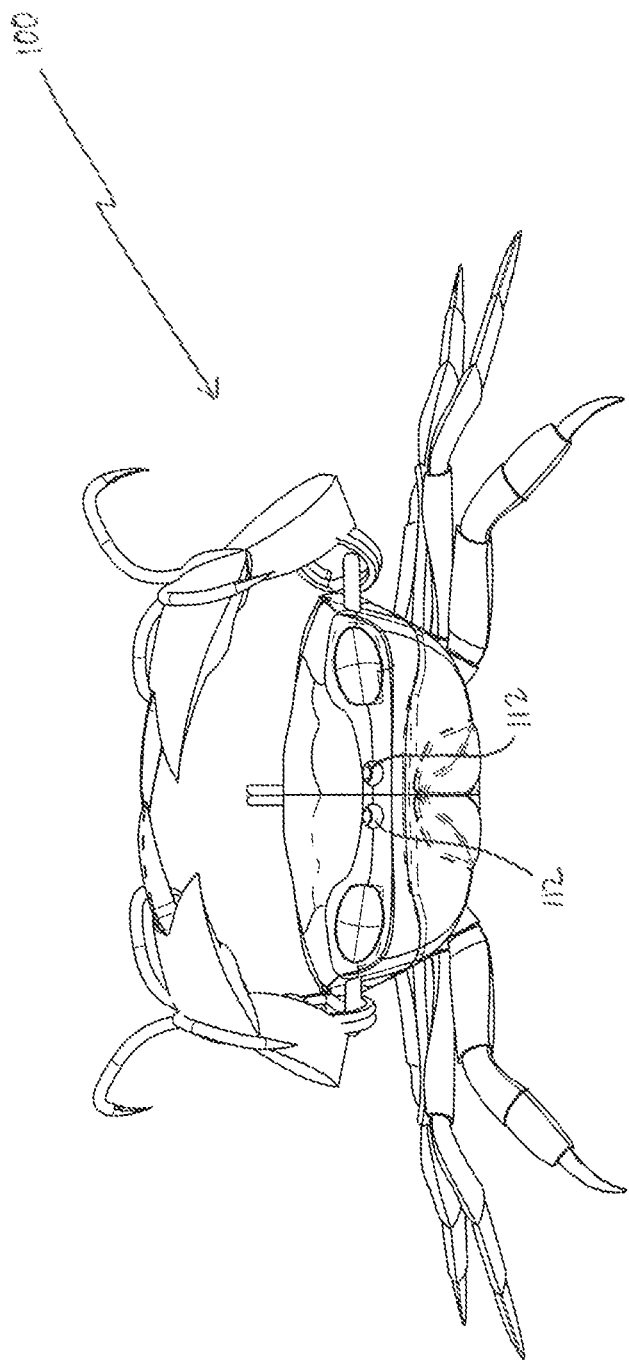
FIG. 12 is a front view of the lure of FIG. 11, showing front scent holes through which a scent-water mixture exits the lure into the surrounding water.

FIGS. 10 to 12 show an alternative embodiment of a lure 100, in which water can be drawn into a scent chamber 102 by pulling the lure 100 through water. The construction of the lure 100 is generally as discussed above in relation to lure 10. For that reason, much of the detail of the structure of the lure 100 will not be described save identifying non-buoyant member 104, weight 106 and loop 108.

The scent chamber 102 is defined by a large recess in the body 104, and an upper surface of the weight 106. Solid or liquid scent can be added to the scent chamber 102 before attaching the weight 106. However, as discussed below the present embodiment permits the use of permanently attached weights or weights that are integral with the non-buoyant member 104. To that extent, lure 100 is configured to permit filling and refilling of the scent chamber 102 even while the weight 106 remains in place on the non-buoyant member 104.

As with lure 10, the lure 100 is again shaped like a crab. In contrast to lure 10, however, the lure 100 includes a scent port or inlet aperture 110 at the rear of the lure 100, and a pair of scent ports or outlet apertures 112 at the front of the lure 100.

The inlet aperture 110 is a means for enabling fluid communication between the scent chamber 102 and water surrounding the lure 100. The inlet aperture 110 can also be used to fill or refill the scent chamber 102 with scent.

As shown in FIG. 11, the inlet aperture 110 is positioned beneath the loop 108 to which a fishing line or tackle attaches. The inlet aperture 110 is angled slightly upwardly so that water entering the scent chamber 102 through the inlet aperture 110 is directed slightly downwardly as indicated by arrow X.

The inlet aperture 110 also provides a port for filling and refilling the lure 100 with scent. Being able to so fill the lure 100 removes the need to dismantle the lure 100 in order to introduce additional scent into the chamber 102 after the scent in the chamber 102 has been depleted.

Scent can be injected or otherwise delivered through the inlet aperture 110 to the scent chamber 102 by any appropriate device.

As water enters and moves through the scent chamber 102 it mixes with scent in the scent chamber 102. While adequate mixing will occur in many circumstances simply by having water or fluid move into or past the scent, it may be desirable to promote more thorough or vigorous mixing of fluid with the scent. To so promote mixing, the recess in the body 104 or an upper surface of the weight 106 may be roughened or have internally directed protrusions (not shown) extending from the walls of the recess into the scent chamber 102. The rough walls and protrusions are examples of members that disturb the flow of water through the scent chamber 102, increasing turbulence and promoting mixing of fluid with scent in the scent chamber 102.

After mixing, the scent-water mixture exits the outlet apertures 112. In the embodiment shown in FIG. 12 the forward outlet apertures 112 comprise the nostrils of the crab and are position in an upper part of the scent chamber 102. The outlet apertures 112 extend substantially horizontally when the lure 100 is on a level surface, though the outlet apertures 112 can have any desired angle or orientation. To ensure evacuation of air from the cavity 102, to facilitate sinking of the lure 100, it is also advantageous to have the outlet apertures 112 positioned in an upper part of the scent chamber. Thus as water moves into the cavity, air will be forced upward and out of the outlet apertures 112.

The relative positions of the inlet aperture 110 and the outlet aperture 112 can also promote mixing of water with scent. For example, since the inlet aperture 110 is angled slightly upwardly, water entering the inlet aperture 110 is directed slightly downwardly as indicated by arrow X. Since the inlet apertures are positioned relatively lower in the scent chamber 102 when compared with the outlet apertures 112, the water must change direction after passing through the inlet aperture 110 in order to travel upwardly to exit through the forward outlet apertures 112. Forcing the fluid to change direction within the scent chamber 102 in the manner afforded by the positions and directions of the inlet aperture 110 and outlet apertures 112 assists with mixing of the fluid and scent in the scent chamber 102.

It will be appreciated that the number of inlet and outlet apertures, their shape (e.g. round, ellipsoid, rectangular), orientation (e.g. the inlet aperture 110 being angled slightly upwardly, away from the bed or floor in use) and positions can be selected as desired. For example, a single outlet aperture 112 or a pair of inlet apertures 110 may be provided. Alternatively, there may be a common inlet and outlet aperture or apertures (i.e. the inlet aperture(s) is/are also the outlet aperture(s)).

In use in water, water generally follows the trajectory indicated by arrow X in FIG. 10. As indicated, water will enter the scent chamber 102 via the rear inlet aperture 110 and mix with the scent contained in the scent chamber 102. The scent-water mixture then exits the forward outlet apertures 112 into the water surrounding the lure 100. To increase the rate at which water enters the lure 100, rearward motion can be imparted on the lure 100 by a fishing line attached to loop 108. This rearward motion forces water into the inlet aperture 110 and through the lure 100, promoting rapid mixing and dispensing of scent from the lure 100.

The inlet aperture 110 and/or outlet apertures 112 may have a seal (e.g. a rubber cap) that restricts, prevents or limits ingress/egress of fluid, so that mixing substantially only occurs when the lure 100 is drawn through the water by a fishing line.

It will be appreciated that many variations and modifications may be made to the embodiments disclosed herein, without departing from the spirit and scope of the invention. In particular, the lure 10 may replicate the appearance of another sea creature, for example a sea creature having only one limb. The lure 10 may also be provided in a disconnected form, as shown in FIG. 2, for later assembly. Since the various components of the lure 10 can be disconnected from one another, any damaged components can be replaced and various different combinations of legs 18, claws 14 and body 12 can be used to suit particular conditions or a particular fishing spot.

The fishhooks 16 may be attached to the buoyant members, non-buoyant members 12 or elsewhere on the lure 10. The lure 10 may also not include a fishhook 16 and fishhooks may instead be provided on a line 60 above the lure 10 or otherwise fixed in relation to the lure 10 so as to catch a fish lured by the lure 10. The fishhook 16 may also be any type or size of hook.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art, in Australia or any other country.

The invention claimed is:

1. A lure having the appearance of a sea creature and comprising:
   a non-buoyant member; and
   at least one buoyant member having the appearance of a limb of the sea creature, wherein the buoyant member is connected or connectable to the non-buoyant member by a flexible connector located between the buoyant and non-buoyant members, wherein the flexible connector is configured to space the buoyant member away from the non-buoyant member so that the entire buoyant member moves independently relative to the non-buoyant member to thereby be able to float above the non-buoyant member when the non-buoyant member rests on a seabed below a water surface.

2. The lure according to claim 1, wherein the buoyant member has at least one buoyant characteristic.

3. The lure according to claim 2, wherein the buoyant characteristic is that the buoyant member is formed from a material that is less dense than the non-buoyant member.

4. The lure according to claim 1, wherein the buoyant member and non-buoyant member are formed from different materials.

5. The lure according to claim 1, wherein the buoyant member and non-buoyant member are formed from the same material.

6. The lure according to claim 1, wherein the buoyant member and non-buoyant member are formed from or materials of different densities.

7. The lure according to claim 1, wherein the buoyant member is at least partially formed from one or more of a soft plastics material, foam, a hard plastics material and rubber.

8. The lure according to claim 1, wherein the buoyant member is formed from a soft plastic.

9. The lure according to claim 1, wherein the non-buoyant member is formed from a hard plastic.

10. The lure according to claim 1, further comprising a fishhook attached or attachable to the lure.

11. The lure according to claim 1, further comprising a weight.

12. The lure according to claim 1, wherein the non-buoyant member is sufficiently heavy so that it will sit on or just above a seabed in use.

13. The lure according to claim 1, wherein the buoyant member can be disconnected from the non-buoyant member.

14. The lure according to claim 1, wherein the flexible connector is a pair of interconnecting loops, one of the pair of loops being provided on the buoyant member and the other of the pair of loops being provided on the non-buoyant member.

15. The lure according to claim 1, which is shaped so as to have the appearance of a crab.

16. The lure according to claim 1, wherein the buoyant member is formed from a material having a density that enables water moving about the lure to cause visible movement in the buoyant member.

17. The lure according to claim 1, wherein the non-buoyant member has the appearance of a body of the sea creature.

18. The lure according to claim 10, wherein the fishhook is, in use, supported above the non-buoyant member by being attached to the buoyant member.

19. A lure having the appearance of a sea creature and comprising:
- a non-buoyant member; and
- at least one buoyant member having the appearance of a limb of the sea creature, wherein the buoyant member is connected or connectable to the non-buoyant member by a flexible connector located between the buoyant and non-buoyant members, wherein the flexible connector is configured to space the buoyant member away from the non-buoyant member, wherein the flexible connector is configured to have a loop connection so that the entire buoyant member moves independently relative to the non-buoyant member to thereby be able to float above the non-buoyant member when the non-buoyant member rests on a seabed below a water surface.

* * * * *